Sept. 16, 1958     R. J. SMITH     2,852,321
SEALED BEARING ASSEMBLY
Filed Dec. 27, 1955
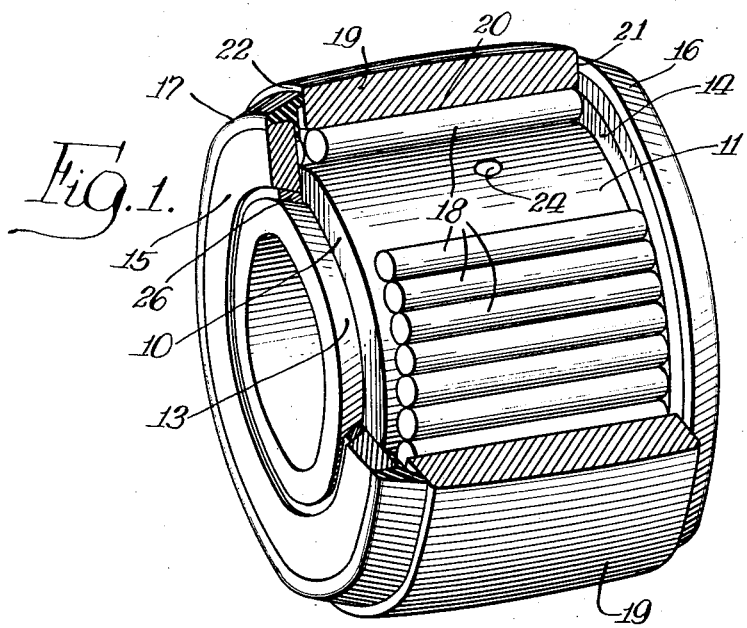
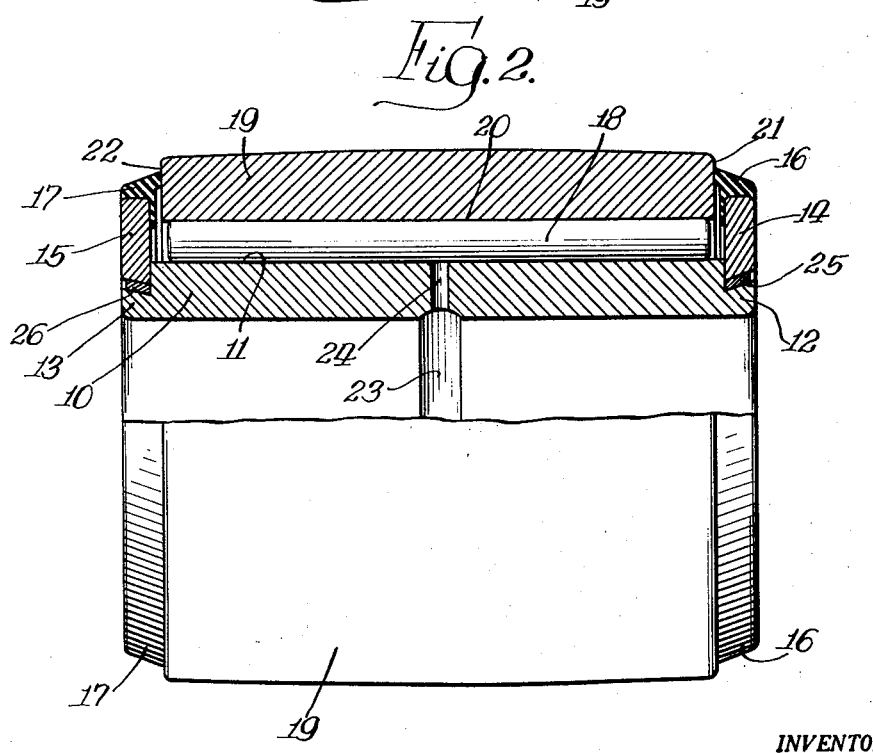
INVENTOR.
Richard J. Smith,
BY Mueller & Aichele
Atty's.

United States Patent Office 2,852,321
Patented Sept. 16, 1958

2,852,321

SEALED BEARING ASSEMBLY

Richard J. Smith, Valparaiso, Ind., assignor to McGill Manufacturing Company, Inc., Valparaiso, Ind., a corporation of Indiana Application December 27, 1955, Serial No. 555,376

2 Claims. (Cl. 308—187.2)

This invention relates to roller bearing assemblies and more particularly to an improved roller bearing assembly that includes a sealing means for retaining the lubricant within the bearing and for excluding foreign matter.

The usual roller bearing includes an inner and an outer race ring in coaxial relation, with a series of rollers disposed between the race rings in rolling engagement with the respective raceways formed by the inner surface of the outer race ring and by the outer surface of the inner race ring. A pair of annular end plates may be mounted for example, in friction fit over the ends of the inner race ring to embrace the rollers and the outer race ring so as to limit axial motion thereof and maintain the bearing in an assembled condition.

Difficulties have been encountered in providing a sealing means for roller bearings of the type described in the preceding paragraph which will adequately seal the bearing, and at the same time will not be susceptible to jamming or add unduly to the cost of the unit. Since endwise or axial motion of the rollers and outer race ring between the end plates is inherent in this type of bearing, the provision of an adequate sealing arrangement of sufficient flexibility to permit free rotation of the bearing while still allowing jam-free endwise motion of the outer race has been a real problem.

It is an object of the present invention to provide an improved sealed roller bearing of the general type described above and which may be constructed relatively inexpensively and with a minimum of added components.

Another object is to provide such an improved sealed roller bearing which is capable of free rotation, and which is not susceptible to jamming even in the presence of relative axial motion between the races.

A feature of the invention is the provision of a rubber face-type seal bonded to at least one annular end plate of a bearing of the type discussed previously herein, which seal has an annular lip extending axially inwardly into sealing engagement with the radial annular end face of one of the races.

The above and other features of the invention which are believed to be new are set forth with particularity in the appended claims. The invention itself, however, together with further objects and advantages thereof, may best be understood by reference to the following description when taken in conjunction with the accompanying drawing in which:

Fig. 1 is a perspective view, partly in section, of the improved sealed roller bearing of the present invention; and Fig. 2 is a side view of the bearing, partly in section.

The invention provides a roller bearing assembly having a self-contained sealing means for excluding dirt and for retaining lubricant in the assembly, and which bearing comprises an inner cylindrical race ring having a raceway on the outer surface thereof. A pair of annular end plates are mounted respectively on the end portions of the inner race ring, for example, and a pair of resilient face-type annular seals are affixed respectively to the outer rim of the end plates. Each of the seals has an annular flexible lip extending a selected distance inwardly from its associated end plate in an essentially axial direction. A series of rollers are disposed within the axial limit of the inner race ring in rolling engagement with the raceway, and with the end plates limiting axial motion of the rollers and retaining them in position on the raceway. An outer cylindrical race ring is mounted coaxially with the inner race ring and has a raceway on the inner surface thereof, in rolling engagement with the rollers. The outer race ring is retained in position by the end plate, and it has an annular face at each end thereof with each face extending in a radial plane, these faces being in respective sealing engagement with the flexible lips of the corresponding seals.

The bearing illustrated in Figs. 1 and 2 of the accompanying drawing includes an inner cylindrical race ring 10 whose outer surface 11 forms a raceway, and the inner race ring has end portions 12 and 13 of lesser outer diameter than the diameter of the raceway. A pair of annular end plates 14, 15 are mounted respectively on the end portions 12, 13 of the inner race ring. These end plates may be held in place by respective split resilient retaining bands 25, 26. The outer peripheral surface of end portion 12 and of end portion 13 are each formed to define a groove which receives the inner annular edge of end plate 14 and of end plate 15, which edges are shaped to be essentially parallel with the aforementioned surfaces of end portions 12 and 13; and the bands 25, 26 engage these edges and surfaces to hold the end plates firmly and rigidly in place. Of course, other mounting means for the end plates may be used, and they may be held in place, for example, by peening over the ends of portions 12 and 13.

A pair of resilient face-type annular seals 16, 17 are attached respectively to the outer rims of the end plates 14, 15. These outer seals are composed, for example, of synthetic rubber bonded to the end plates by any usual bonding process. Each of the seals 16, 17 is shaped to have an annular flexible lip extending a selected distance inwardly from the corresponding end plates, the lips being inclined slightly but extending essentially in an axial direction.

A series of rollers 18 are disposed within the axial limits of the inner race ring 10 in rolling engagement with the raceway 11. The end plates 14 and 15 limit the axial movement of the rollers and retain them in position on the raceway. An outer cylindrical race ring 19 is mounted coaxially with the inner race ring, and the inner surface of the race ring 19 forms a raceway 20 in rolling engagement with the rollers. The outer race ring, like the rollers, is retained in position by the end plates 14 and 15 which limits its axial motion. The outer race ring has respective annular faces 21, 22 at the ends thereof and which lie in respective radial planes and in respective sealing engagement with the flexible lips of the seals 16 and 17.

The inner annular surface of the inner race 10 has a lubrication groove 23 formed therein which communicates with the rollers 20 through a series of apertures such as apertures 24.

As is evident from an examination of Figs. 1 and 2, the seals 16 and 17 function as face-type seals and their annular lips make a pressure sealing contact against the corresponding annular end faces 21, 22 of the outer race ring. The flexible annular lips of seals 16 and 17 have sufficient resiliency and freedom of movement so as to allow normal endwise motion of the outer race ring without unduly impeding the rotational motion of the bearing. This endwise motion is generally between .008 inch and .017 inch on a usual bearing of this general type, and the annular lips of the seals as described above does have sufficient flexibility to allow the bearing to rotate freely in the presence of such endwise movement, and, at the same time, the seals adequately and sufficiently seal the lubricant into the bearing and exclude dirt and other foreign matter.

The invention provides, therefore, a sealed roller bearing in which the sealing means is formed on one of the operative components of the bearings by a simple bonding process. Moreover, the sealing means has a configuration and composition so that it exerts sealing pressure in an axial direction and adequately seals the unit in the presence of endwise motion of the race ring without being susceptible to jamming, and maintaining an adequate seal.

A constructed embodiment of the invention has the following dimensions and composition, and these are listed herein merely by way of an illustrative example, which, of course, is not intended to limit the invention in any manner:

| | |
|---|---|
| Width of bearing | 1.000 inch. |
| Outer diameter of outer race | 1.250 inches. |
| Inner diameter of inner race | .625 inch. |
| Width of outer race | .906 inch. |
| Outer diameter of end plates (including seal) | 15/32 inches. |
| Width of annular end plates | .094 inch. |
| Clearance between rollers and end plates | .004–.0075 inch. |
| End plates—stainless steel and bonded synthetic rubber | Heat treated to 55 $R_c$ minimum. |
| Inner race rings | S. A. E. 52100 steel, zone hardened to 60 $R_c$ minimum, cadmium plated. |
| Outer race ring | S. A. E. 52100 steel, heat treated to 60 $R_c$ minimum, cadmium plated. |

It has been found that bearings of the type described above may be manufactured on an economical and commercially practical basis, and that the sealing means incorporated therein efficiently performs its sealing function without any susceptibility to jamming and without excessively impeding the free rotation of the bearing.

I claim:

1. A roller bearing assembly having a self-contained sealing means for excluding dirt and for retaining lubricant in the assembly including in combination, an inner cylindrical race ring having a raceway on the outer surface thereof and having integral end portions of lesser outer diameter than the diameter of the race ring at said raceway, a pair of annular end plates respectively mounted on said end portions of said inner race ring and each having an annular outer rim face, a pair of rubber annular-shaped seals respectively secured to the outer rims of said end plates, each of said seals having an annular body portion bonded on the inside surface thereof to the corresponding annular outer rim face of an end plate and having one annular integral flexible lip extending from the body portion a selected distance inwardly from the associated end plate in an essentially axial and radial direction, a series of rollers disposed within the axial limits of said inner race ring in rolling engagement with said raceway, with said end plates limiting axial motion of said rollers and retaining said rollers in position on said raceway, and an outer cylindrical race ring mounted coaxially with said inner race ring and having a raceway on the inner surface thereof in rolling engagement with said rollers, said outer race ring being retained in position by said end plates and having an annular face at each end thereof in a radial plane, and with said annular integral flexible lip in sealing engagement with the annular face of the outer race ring.

2. In a roller bearing assembly comprising an outer race ring and an inner race ring with rollers positioned between the same and in engagement with a raceway on the inside of the outer-race ring and a raceway on the outside of the inner race ring, with the circumference of the latter raceway being of a selected dimension, said inner race ring having an integral restricted portion at each end with a circumference less than the said selected circumference dimension of the raceway, and means for sealing the bearing to exclude dirt and retain lubricant at the rollers between the race rings, said sealing means comprising an annular end plate secured on the restricted portion at one end of the inner race ring and an identical annular end plate secured on the other restricted portion of the inner race ring, with each end plate having an outer-rim face thereon positioned opposite the corresponding end face of the outer race ring, and further comprising a pair of resilient rubber seals with one seal mounted on the outer rim face of each end plate and having a body portion bonded to the rim face, each rubber seal also including a single flexible integral lip extending in an essentially axial and radial direction from its body portion and in a running engagement with the corresponding adjacent end face of the outer race ring.

References Cited in the file of this patent

UNITED STATES PATENTS

| | | |
|---|---|---|
| 2,360,078 | Smith et al. | Oct. 10, 1944 |
| 2,391,007 | Buckendale | Dec. 18, 1945 |
| 2,547,185 | Von Bolhar | Apr. 3, 1951 |